United States Patent [19]

Sando et al.

[11] Patent Number: 4,772,398

[45] Date of Patent: Sep. 20, 1988

[54] METHOD FOR TREATMENT OF WASTE WATER AND ITS APPARATUS

[75] Inventors: Yoshikazu Sando; Hiroshi Ishidoshiro, both of Wakayama, Japan

[73] Assignee: Sando Iron Works Co., Ltd., Wakayama, Japan

[21] Appl. No.: 12,181

[22] Filed: Feb. 9, 1987

[30] Foreign Application Priority Data

Feb. 13, 1986 [JP] Japan .................................. 61-29765
Mar. 24, 1986 [JP] Japan ............................. 61-42697[U]

[51] Int. Cl.$^4$ ........................... C02F 1/24; B03D 1/00
[52] U.S. Cl. .................................... 210/703; 210/783; 210/221.1; 210/258; 210/391; 210/400
[58] Field of Search ................................ 210/703–707, 210/221.1, 221.2, 400, 783, 791, 797, 258, 391, 396, 408, 409, 416.1

[56] References Cited

U.S. PATENT DOCUMENTS 3,063,939  11/1962  Katz .................................... 210/703
3,479,281  11/1969  Kikindoi et al. .................... 210/703
3,642,617   2/1972  Brink et al. ......................... 210/704
3,822,015   7/1974  Hsieh et al. ................... 210/221.2 X
4,340,487   7/1982  Lyon ................................... 210/705
4,407,715  10/1983  Sheludko et al. ............. 210/221.2 X

*Primary Examiner*—Tom Wyse
*Attorney, Agent, or Firm*—Toren, McGeady & Associates

[57] ABSTRACT

For the treatment of waste water in the liquid treatment of a textile material, air bubbles are generated in water containing floating impurities stored tentatively in a waste water tank so as to adhere the impurities on the surface of the air bubbles, adhering the impurities together with air bubbles on the surface of a filter comprising a mesh belt or a mesh drum by pulling up the filter successively, and removing the impurities from the filter thus pulled up due to the effect of vacuum suction, and an apparatus therefor. The impurities remaining still on the surface of the filter may further be removed therefrom by washing the filter with the aid of water and air jets.

4 Claims, 2 Drawing Sheets

METHOD FOR TREATMENT OF WASTE WATER AND ITS APPARATUS

BACKGROUND OF THE INVENTION

1. Field of the Invention

The present invention relates to a method and an apparatus for the treatment of waste water discharged in the liquid treatment of a textile material produced commercially for the purpose to remove and recover the floating impurities contained in the waste water effectively.

2. Description of the Related Art

There are such treatments as desizing, water washing, scouring-bleaching and mercerization as the liquid treatment of a long textile material produced commercially, and in the course of these liquid treatments, particularly in desizing, water washing and mercerization of a cloth, it is usual that a large quantity of water resource is consumed. In recent years, the development of a continuous processing of a textile material and a treating apparatus thereof by reducing the amount of water to be consumed have been intended to meet with the demand of the economy of resources, and excellent apparatuses to answer such a demand have been realized.

Nevertheless, even in using such an apparatus, it is difficult to reduce the amount of water to be used to zero, and it is unavoidable to consume a certain amount of water. In using water in the processing and treatment of a textile material, waste water is formed unavoidably, and particularly, the waste water in the treatment of a textile material contains generally a large amount of floating impurities such as waste yarns. Therefore, it is necessary to remove and recover such floating impurities for the reuse of such waste water or also for the disposal thereof.

As a conventional method for the removal of floating impurities such as waste yarns contained in waste water in the treatment of a cloth, it is the present status to adhere such substances on a filter such as made of a wire gauze by immersing the filter in waste water or transporting it through waste water, and to remove and recover the impurities adhered on the filter. However, in such a method for removing floating impurities with the use of a filter, the impurities are adhered firmly on the surface of the filter, missing the efficiency as a filter in the course of treatment, so that the impurities adhered on the surface of the filter must be removed successively. Furthermore, since the impurities are frequently penetrated into the gaps of the filter, it is very troublesome to remove such impurities.

SUMMARY OF THE INVENTION

Under such circumstances, the object of the present invention is to offer a method and an apparatus for the treatment of waste water in the continuous liquid treatment of a textile material, in which the floating impurities recovered by means of a filter such as wire gauze can be removed easily and surely from the filter.

The principle of the invention comprises to mix the impurities floating in waste water with air bubbles for adhering the impurities on the surface of a filter via the air bubbles, and to remove the impurities adhered on the filter under vacuum.

The impurities adhered on the filter can easily be removed without deteriorating the efficiency of the filter for a long while because the impurities are existing together with air bubbles, and thus it is possible to offer a superior method and apparatus for the continuous treatment of waste water in textile industry.

DETAILED DESCRIPTION OF THE PREFERRED EMBODIMENTS

Now, the embodiments of the present invention will be described in detail in the following with reference to the accompanying drawings.

EXAMPLE 1

Figure 1:
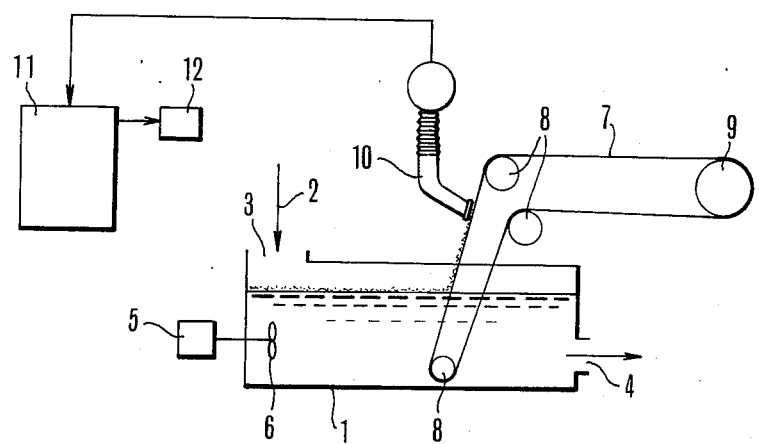
FIG. 1 is an explanatory drawing showing an example of the present inventive apparatus for the continuous treatment of waste water in the liquid treatment of a cloth.

FIG. 1 is to show an example of the present inventive apparatus. In the FIG. 1 is a waste water tank for storing waste water 2 discharged, for instance, from the water washing process of a textile material tentatively. A waste water inlet 3 is provided at one side of the waste water tank 1, and a waste water outlet 4 is provided nearly at the opposite position to the waste inlet 3. 5 is a motor for driving a rotary wing 6 provided at the lower part of the waste water tank 1, and thus air bubbles are formed in the waste water due to stirring. 7 is an endless mesh belt for pulling up the floating impurities in the waste water together with said air bubbles. The mesh belt comprises for example, fine pores with a size of 120 meshes. 8 represents guide rolls for pulling up said mesh belt continuously, and 9 is a driving roll for driving the mesh belt 7. 10 is a vacuum nozzle provided adjacent to the surface of the mesh belt 7 and is connected via a recovery container 11 to a suction pump 12 for removing the impurities adhered on the surface of the mesh belt.

The construction of this example of the present inventive apparatus is as above described. Then, its function will be illustrated in the following. Waste water containing floating impurities such as waste yarns in the waste water tank 1 is stirred with the use of the rotary wing 6 driven by means of the motor 5. Air bubbles are formed in the waste water, and are floated up by carrying the floating impurities on the surface of the water. Namely, floating impurities such as waste yarns are adhered on the surface of the air bubbles and are floated up together with the air bubbles on the surface of the waste water. In driving the suction pump 12 while circulating the endless mesh belt 7 by rotating the drive roll 9 (with the use of a motor not shown in the figure), the impurities floated up with the air bubbles are pulled up in a state adhered on the surface of the mesh belt 7, and the impurities thus adhered on the surface of the mesh belt are removed therefrom due to the suction force of the vacuum nozzle 10 operated by the suction pump 12 into the recovery container 11.

As a result, the cleaning of the mesh belt surface can continuously and effectively be done, and there is usually no danger that the openings of the mesh belt are choked. Further, in discharging a suitable amount of the waste water continuously from the waste water tank 1 through the waste water discharge outlet 4, floating impurities in the waste water are flown successively toward the mesh belt 7 due to the flow of the waste water in the tank 1, thus promoting the removal of the floating impurities.

By the way, while the impurities pulled up with the use of the mesh belt 7 are removed due to the vacuum action, the method for the removal of the pulled up impurities is not limited to vacuum action, and such method as the blowing off of the impurities with the use of air pressure can also be applied. Instead of a mesh belt, such a filter as a mesh drum may also be applied.

According to the apparatus in this example, therefore, floating impurities in the waste water in textile industry can easily be floated up together with air bubbles on the surface of a mesh belt due to the effect of the formation of air bubbles in the waste water tank without leaving the impurities in the tank, and the floated up impurities are readily removed from the mesh belt. The difficulty that the impurities adhered on the mesh belt can not easily be removed in the prior arts due to the penetration of the impurities into the interior thereof can easily and surely be dissolved.

EXAMPLE 2

Figure 2:
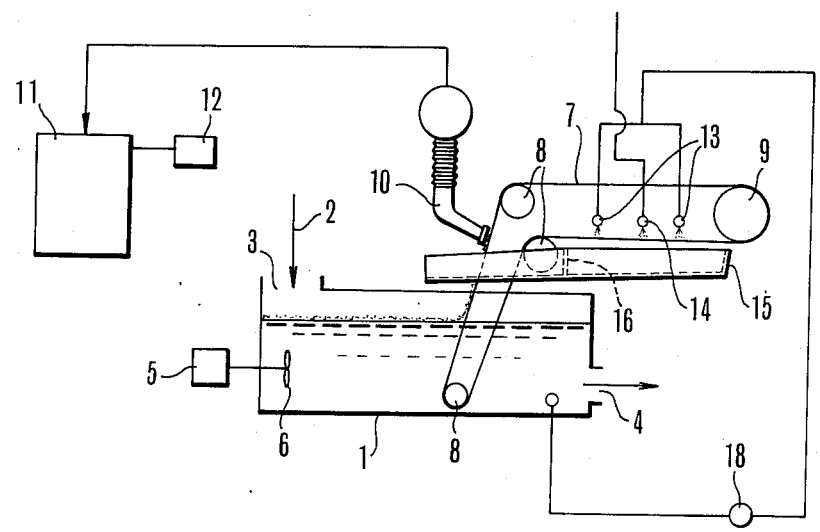
FIG. 2 is an explanatory drawing showing another example of the present inventive apparatus.
Figure 3:
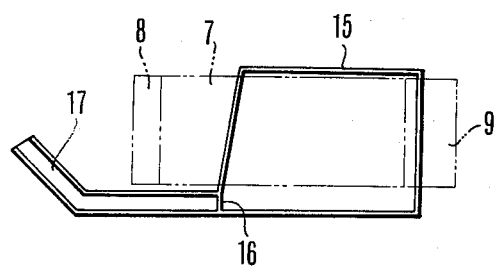
FIG. 3 is a plane figure of the essential part of the apparatus in FIG. 2.

The apparatus in this example comprises, as shown in FIGS. 2 and 3, a washing means of the mesh belt 7 after the impurities adhered thereon has been removed by means of the action of the vacuum nozzle 10. Namely, in FIG. 2, 13 represents a plurality of shower nozzles for blowing washing water to the mesh belt 7 in order to wash off the impurities such as waste yarns adhering still on the mesh belt 7. 14 comprises a group of air jet nozzles for blowing off the impurities on the mesh belt 7 from the backside thereof. 15 is a saucer of the washing water provided below the mesh belt 7 at the position under the shower nozzles 13 and the air jet nozzles 14. As shown in FIG. 3, the washing water received in the saucer 15 is returned via a filter 16 and a conduit 17 into the waste water tank 1. 18 in FIG. 2 is a pump for jetting the waste water in the waste water tank 1 to the mesh belt 7 through the shower nozzles 13.

In the case of the apparatus in this example, the impurities which are not removed sufficiently due to the vacuum force of the vacuum nozzle 10 are further removed completely by the forces of water and air jetted respectively from the shower nozzles 13 and the air jet nozzles 14. As already mentioned, the impurities adhered on the mesh belt can sufficiently be removed by the action of the vacuum nozzle 10 in usual. However, in the case when the impurities are very fine and/or adhered firmly on the mesh belt, the apparatus in this example is particularly effective.

What is claimed is:

1. A method for the treatment of waste water in the liquid treatment of a textile material, comprising:

flowing waste water containing floating impurities from a textile material treatment process in one end of a waste water tank and withdrawing waste water from another end spaced from the one end with the tank having a liquid level, generating air bubbles by a stirring the waste water containing floating impurities stored tentatively in a waste water tank at the one end of the tank so as to adhere the impurities on the surface of the air bubbles;

floating the impurities and air bubbles to the liquid level in the tank, adhering said impurities together with air bubbles on the surface of a filter extending downwardly into the tank below the liquid level by pulling up said filter successively above the liquid level with the filter spaced between the one and another ends; and removing said impurities from the filter thus pulled up spaced above the liquid level due to the effect of vacuum suction.

2. A method for the treatment of waste water according to claim 1, in which further removing the impurities remaining on the surface of the filter after the vacuum suction removal with the aid of water and air jets before returning the filter below the liquid level in the tank.

3. An apparatus for the treatment of waste water in the liquid treatment of a textile material, comprising:

a waste water tank for storing waste water containing floating impurities tentatively, said tank having a first end spaced from a second end and containing a liquid level with a waste water inlet at the first end and a waste water outlet at the second end;

means located adjacent the first end of said tank below the liquid level for generating air bubbles in the waste water by driving a rotary wing in said water tank so as to adhere the impurities on the surface of the air bubbles and float the impurities to the liquid level;

an endless filter comprising one of a mesh belt and a mesh drum extending downwardly below the liquid level between the first and second ends for pulling up above the liquid level the impurities together with air bubbles adhered on said filter continuously from the waste water tank; and a vacuum mechanism located above the liquid level for removing the impurities adhered on the filter thus pulled up.

4. An apparatus for the treatment of waste water according to claim 3, in which additional means for cleaning the filter located above the liquid level and comprising water and air jet nozzles is provided downstream in the manner of the filter from said vacuum mechanism for removing the impurities remaining on the surface of said filter.

* * * * *